US012516869B2

(12) United States Patent
Leone et al.

(10) Patent No.: US 12,516,869 B2
(45) Date of Patent: Jan. 6, 2026

(54) LOCATOR RAIL FOR APPLIANCE DOOR HINGE

(71) Applicant: Haier US Appliance Solutions, Inc., Wilmington, DE (US)

(72) Inventors: Davide Jonathan Leone, Louisville, KY (US); Jorge Villares Sanchez, Louisville, KY (US); Juan Suárez González, Louisville, KY (US)

(73) Assignee: Haier US Appliance Solutions, Inc., Wilmington, DE (US)

(*) Notice: Subject to any disclaimer, the term of this patent is extended or adjusted under 35 U.S.C. 154(b) by 114 days.

(21) Appl. No.: 18/521,605

(22) Filed: Nov. 28, 2023

(65) Prior Publication Data

US 2025/0172329 A1 May 29, 2025

(51) Int. Cl.
*F25D 23/02* (2006.01)
*E05D 11/00* (2006.01)

(52) U.S. Cl.
CPC ............ *F25D 23/028* (2013.01); *E05D 11/00* (2013.01); *E05Y 2600/56* (2013.01); *E05Y 2900/31* (2013.01); *F25D 2323/024* (2013.01)

(58) Field of Classification Search
CPC ............. F25D 23/028; F25D 2323/024; E05D 11/00; E05Y 2600/56; E05Y 2900/31
See application file for complete search history.

(56) References Cited

U.S. PATENT DOCUMENTS

| | | | | | |
|---|---|---|---|---|---|
| 4,099,812 | A * | 7/1978 | Morphy | F25D 23/064 | 220/919 |
| 5,265,954 | A * | 11/1993 | Keil | E05D 7/081 | 312/405 |
| 5,960,518 | A * | 10/1999 | Jeong | E05D 7/123 | 16/382 |
| 6,036,292 | A * | 3/2000 | Mandel | F25D 23/062 | 312/401 |
| 6,773,082 | B2 * | 8/2004 | Lee | F25D 23/063 | 312/401 |
| 7,065,832 | B2 | 6/2006 | Pohl | | |
| 8,042,890 | B2 * | 10/2011 | Collins | A47B 47/02 | 312/265.5 |
| 8,162,421 | B2 * | 4/2012 | Lim | F25D 23/02 | 312/401 |

(Continued)

FOREIGN PATENT DOCUMENTS

| | | |
|---|---|---|
| CN | 101481971 B | 5/2012 |
| CN | 204024280 U | 12/2014 |

(Continued)

*Primary Examiner* — Eret C Mcnichols
(74) *Attorney, Agent, or Firm* — Dority & Manning, P.A.

(57) ABSTRACT

An appliance includes a case body and a locator rail. The appliance may include a first lip and a second lip on the case body. The locator rail may include a first set of locator tabs and a second set of locator tabs. Each locator tab of the first set of locator tabs may be engaged with one corresponding slot in the first lip of the case body, and each locator tab of the second set of locator tabs may be engaged with one corresponding slot in the second lip of the case body. The appliance may also include a set of bracket locator tabs on the locator rail and a hinge bracket mounted to the locator rail. Each bracket locator tab of the set of bracket locator tabs may be engaged with one corresponding slot in the hinge bracket.

18 Claims, 16 Drawing Sheets

(56) References Cited

U.S. PATENT DOCUMENTS

| | | | | | |
|---|---|---|---|---|---|
| 9,383,135 | B2 * | 7/2016 | Park | E05D 7/081 | |
| 9,810,474 | B2 * | 11/2017 | Fernandez | F25D 23/006 | |
| 10,288,405 | B2 * | 5/2019 | Pranav | G01B 5/25 | |
| 11,124,998 | B1 * | 9/2021 | Fazi | E05D 7/081 | |
| 11,243,022 | B2 * | 2/2022 | Hunter | E05D 7/02 | |
| 11,662,137 | B2 * | 5/2023 | Hunter | E05D 3/02 | 312/405 |
| 11,674,743 | B2 * | 6/2023 | Kang | A47B 96/20 | 312/116 |
| 11,970,895 | B2 * | 4/2024 | Pavnick | E05D 5/065 | |
| 12,163,727 | B2 * | 12/2024 | Krapp | F25D 23/063 | |
| 2010/0219732 | A1 * | 9/2010 | Gorz | F25D 23/064 | 312/405 |
| 2024/0080596 | A1 * | 3/2024 | Song | H04R 1/02 | |
| 2024/0142164 | A1 * | 5/2024 | Kang | F25D 23/02 | |

FOREIGN PATENT DOCUMENTS

| | | | |
|---|---|---|---|
| CN | 204438650 | U | 7/2015 |
| CN | 211549271 | U | 9/2020 |

* cited by examiner

LOCATOR RAIL FOR APPLIANCE DOOR HINGE

FIELD

The present subject matter relates generally to household appliances such as refrigerator appliances, and more particularly to a locator features for case bodies and/or door hinges of such appliances.

BACKGROUND

Household appliances are utilized generally for a variety of tasks by a variety of users. For example, a household may include such appliances as kitchen appliances, e.g., a refrigerator appliance, an oven appliance, a microwave appliance, etc., laundry appliances, e.g., a washing machine appliance and/or dryer appliance, along with other various appliances.

Many household appliances include a cabinet or housing with one or more doors attached to the cabinet. For example, an oven appliance or microwave appliance may include a cooking chamber within the cabinet and one or more doors rotatably coupled to the cabinet, e.g., by hinges, such that the door(s) rotate between a closed position in which the cooking chamber is sealed and enclosed within the cabinet and door and an open position which permits access to the cooking chamber. As another example, laundry appliances generally include a treatment chamber, e.g., inside a drum of a dryer appliance or a tub or basket of a washing machine appliance, which is selectively enclosed or accessible via a door which may be rotatably coupled to the cabinet in a similar manner as described above with respect to cooking appliances. In yet another example, refrigerator appliances may include one or more food storage chambers with one or more doors for each chamber rotatably coupled to the cabinet for each chamber.

Precise and accurate location of the door or doors of a household appliance relative to the cabinet (and to each other when there are multiple doors) is desired in order to increase customer satisfaction and overall perception of the quality of the household appliance. Some household appliances rely on multiple part mounting and aligning systems for locating and coupling doors to the cabinet of the household appliance. Such systems may increase the complexity of assembling the household appliance, and the multiple parts may also result in tolerance stack ups which create excessive design float and difficulty in correctly and consistently locating and aligning the door or doors with each other (when there are multiple doors) and with the cabinet.

Accordingly, it is recognized in the art that improved locating systems would be beneficial for household appliances.

BRIEF DESCRIPTION

Aspects and advantages of the invention will be set forth in part in the following description, or may be apparent from the description, or may be learned through practice of the invention.

In one exemplary embodiment, an appliance is provided. The appliance defines a vertical direction, a lateral direction, and a transverse direction. The appliance includes a case body. The case body includes a left side and a right side opposite the left side. The left side and the right side are spaced apart along the lateral direction. The appliance also includes a first lip on the left side of the case body and a second lip on the right side of the case body. The appliance further includes a locator rail attached to the case body. The locator rail includes a first set of locator tabs at a first end of the locator rail and a second set of locator tabs at a second end of the locator rail opposite the first end of the locator rail. Each locator tab of the first set of locator tabs is engaged with one corresponding slot in the first lip of the case body and each locator tab of the second set of locator tabs is engaged with one corresponding slot in the second lip of the case body.

In another exemplary embodiment, an appliance is provided. The appliance includes a case body. The case body includes a left side and a right side opposite the left side. The left side and the right side are spaced apart along a lateral direction. The appliance also includes a locator rail extending across the case body between the left side and the right side with a set of bracket locator tabs on the locator rail. The appliance further includes a hinge bracket mounted to the locator rail. Each bracket locator tab of the set of bracket locator tabs is engaged with one corresponding slot in the hinge bracket.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
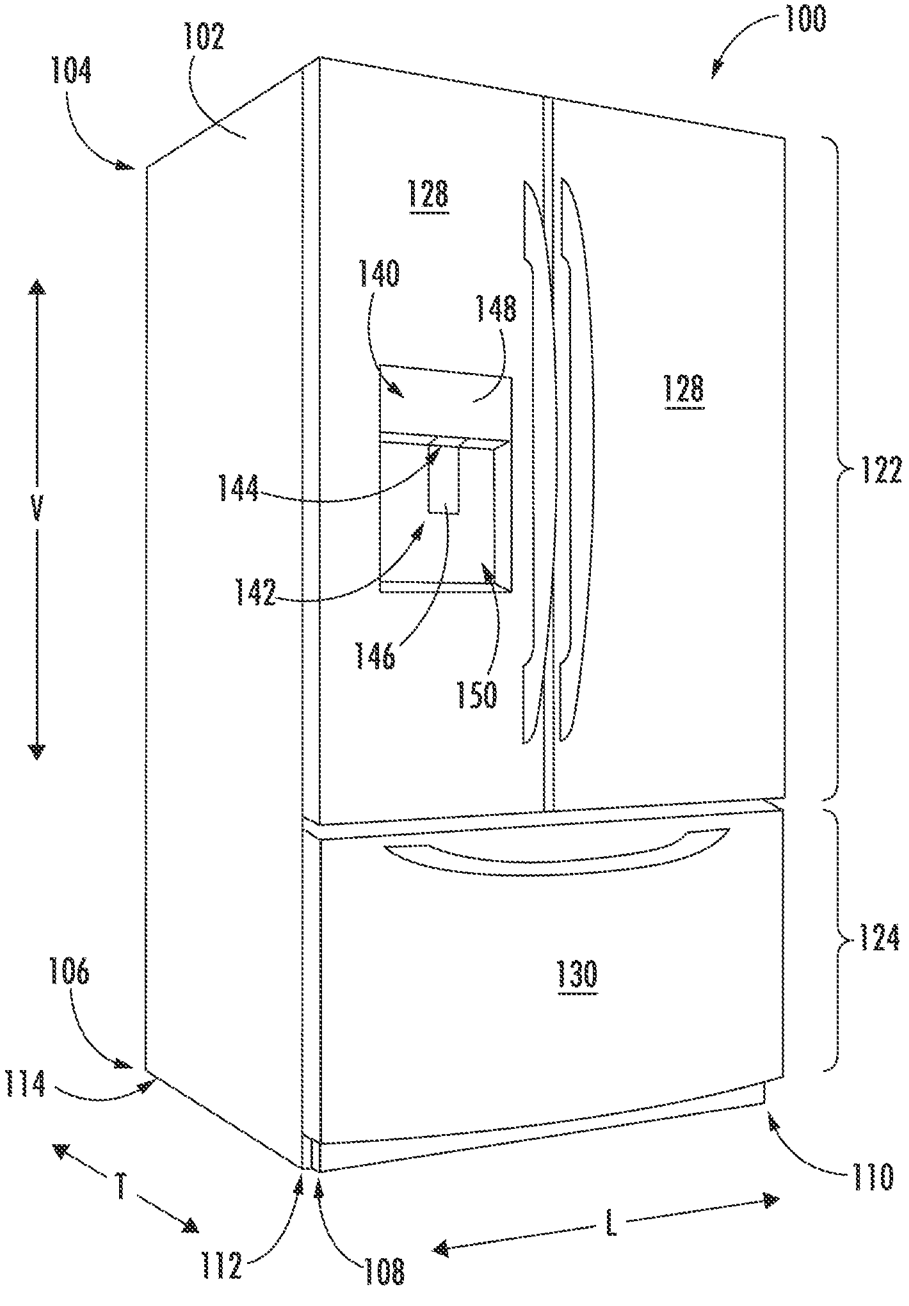
FIG. 1 provides a perspective view of a refrigerator appliance according to one or more exemplary embodiments of the present subject matter.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both").

Terms such as "inner" and "outer" refer to relative directions with respect to the interior and exterior of the refrigerator appliance, and in particular the food storage chamber(s) defined therein. For example, "inner" or "inward" refers to the direction towards the interior of the refrigerator appliance. Terms such as "left," "right," "front," "back," "top," or "bottom" are used with reference to the perspective of a user accessing the refrigerator appliance. For example, a user stands in front of the refrigerator to open the doors and reaches into the food storage chamber(s) to access items therein.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a ten percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise, or counterclockwise, with the vertical direction V.

Figure 2:
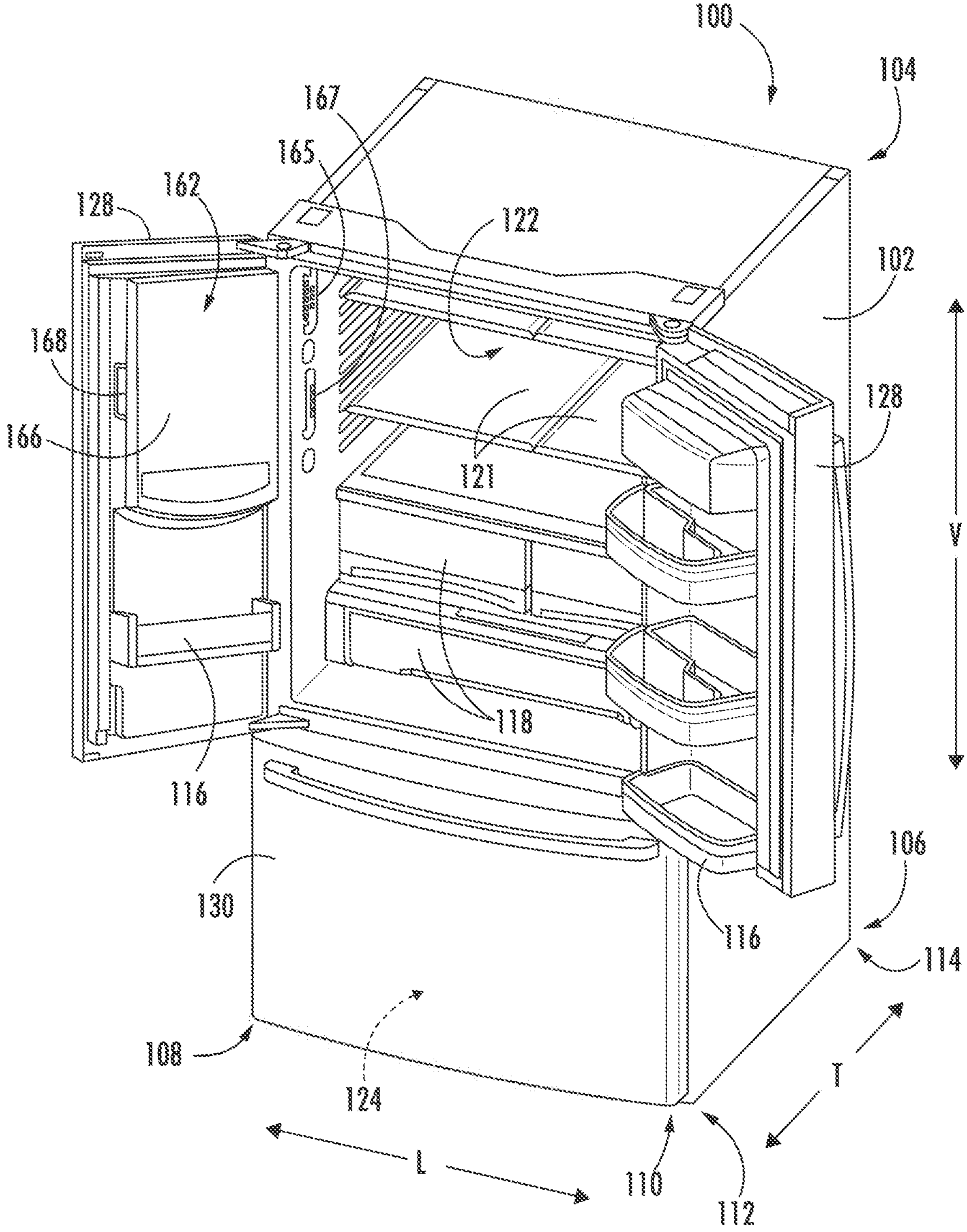
FIG. 2 provides an additional perspective view of the refrigerator appliance of FIG. 1 with doors of the refrigerator appliance in an open position.

Referring now to the figures, FIGS. 1 and 2 provide perspective views of an exemplary household appliance, which in the illustrated example is a refrigerator appliance 100, according to one or more exemplary embodiments of the present subject matter. The household appliance, e.g., refrigerator appliance, may define a vertical direction V, a lateral direction L, and a transverse direction T. The vertical direction V, the lateral direction L, and the transverse direction T may each be mutually perpendicular to one another to generally form an orthogonal coordinate system.

As illustrated in FIGS. 1 and 2, the refrigerator appliance 100 may include a housing or a cabinet 102 that may extend between a top 104 and a bottom 106 approximately along a vertical direction V, between a first side (left side) 108 and a second side (right side) 110 approximately along a lateral direction L, and between a front 112 and a back 114 approximately along a transverse direction T. The cabinet 102 may define one or more chilled chambers for receipt of food items for storage. In some embodiments, the cabinet 102 may define a fresh food chamber 122 positioned at or adjacent the top 104 of the cabinet 102 and a freezer chamber 124 arranged at or adjacent the bottom 106 of the cabinet 102. As such, the refrigerator appliance 100 may generally be referred to as a bottom mount refrigerator.

It is recognized, however, that the benefits of the present disclosure apply to other types and styles of refrigerator appliances such as, for example, a top mount refrigerator appliance, a quad door refrigerator appliance, a side-by-side refrigerator (see, e.g., FIG. 15), a standalone (single chamber) refrigerator or freezer appliance, or other household appliances which generally include a cabinet with one or more doors rotatably mounted to the cabinet. Consequently, the description set forth herein is for illustrative purposes only and is not intended to be limiting in any aspect to any particular household appliance, such as the present subject matter is not limited to any particular refrigerator chamber configuration, or the presence of a refrigerator chamber at all. For example, the present subject matter may also be used with household appliances having a cooking chamber (e.g., in a range or wall oven or microwave) or a laundry treatment chamber (e.g., in a washing machine appliance, dryer appliance, or combination washer-dryer appliance). Accordingly, it should be recognized that aspects of the present disclosure, such as the locator rail and hinge brackets, may be used with a variety of household appliances, such as any household appliance having a cabinet, a chamber defined within the cabinet, and a door rotatably mounted to the cabinet to selectively at least partially enclose the chamber.

The refrigerator doors 128 may be rotatably hinged to an edge of the cabinet 102 for selectively accessing the fresh food chamber 122. In addition, a freezer door 130 may be arranged below the refrigerator doors 128 for selectively accessing the freezer chamber 124. The freezer door 130 may be coupled to a freezer drawer (not shown) slidably mounted within the freezer chamber 124. The refrigerator doors 128 and the freezer door 130 may be shown in the closed configuration in FIG. 1.

In some embodiments, various storage components may be mounted within the fresh food chamber 122 to facilitate storage of food items therein. In particular, the storage components may include storage bins 116, drawers 118, and shelves 121 that may be mounted within the fresh food chamber 122. As such, the storage bins 116, drawers 118, and shelves 121 are configured for receipt of food items, for example, beverages or solid food items, and may assist with organizing such food items. As an example, the drawers 118 can receive fresh food items, for example, vegetables, fruits, or cheeses, and increase the useful life of such fresh food items.

In some embodiments, the refrigerator appliance 100 may also include a dispensing assembly 140 for dispensing liquid water or ice. The dispensing assembly 140 may include a dispenser 142, for example, positioned on or mounted to an exterior portion of the refrigerator appliance 100, such as on one of the refrigerator doors 128. Moreover, as shown in FIG. 1, the dispenser 142 may include a discharging outlet 144 for accessing ice and liquid water. Further, an actuating mechanism 146, shown as a paddle, may be mounted below the discharging outlet 144 for operating the dispenser 142. In alternative embodiments, any suitable actuating mechanism may be used to operate the dispenser 142. A user interface panel 148 may also be provided for controlling the mode of operation. For example, the user interface panel 148 may include a plurality of user inputs (not labeled), such as a water dispensing button and an ice-dispensing button, for selecting a desired mode of operation such as crushed or non-crushed ice.

Still referring to FIG. 1, the discharging outlet 144 and actuating mechanism 146 may be an external part of the dispenser 142 and may be mounted in a dispenser recess 150. The dispenser recess 150 may be positioned at a predetermined elevation convenient for a user to access ice or water and enabling the user to access ice without the need to bend-over and without the need to open the refrigerator doors 128. In additional embodiments, the dispenser recess 150 may be positioned at a level that approximates the chest level of a user.

In further embodiments, for example, as shown in FIG. 2, the refrigerator appliance 100 may include a sub-compartment 162 defined on the refrigerator door 128. The sub-compartment 162 is often referred to as an "icebox." Further, the sub-compartment 162 may extend into fresh food chamber 122 when the refrigerator door 128 is in the closed position. Although the sub-compartment 162 is shown in the refrigerator door 128, additional or alternative embodiments may include the sub-compartment 162 fixed within fresh food chamber 122. In an embodiment, an ice maker and/or an ice storage bin (not shown) may be positioned or disposed within the sub-compartment 162. Accordingly, during use, ice can be supplied to the dispenser recess 150, see, for example, FIG. 1, from the ice making assembly or ice storage bin in the sub-compartment 162 on a back side of refrigerator door 128.

In additional or alternative embodiments, chilled air from a sealed system (not shown) of the refrigerator appliance 100 may be directed into components within the sub-compartment 162. For instance, the sub-compartment 162 may receive cooling air from a chilled air supply duct 165 and a chilled air return duct 167, see, for example, FIG. 2, disposed on a side portion of cabinet 102 of the refrigerator appliance 100. In this manner, the chilled air supply duct 165 and the chilled air return duct 167 may recirculate chilled air from a suitable sealed cooling system through the sub-compartment 162.

In optional embodiments, for example, as illustrated in FIG. 2, an access door 166 may be hinged to the refrigerator door 128. Thus, the access door 166 may permit selective access to the sub-compartment 162. Any manner of suitable latch 168 may be configured with the sub-compartment 162 to maintain the access door 166 in a closed position. As an example, the latch 168 may be actuated by a user in order to open the access door 166 for providing access into the sub-compartment 162. The access door 166 can also assist with insulating the sub-compartment 162 (e.g., by thermally isolating or insulating the sub-compartment 162 from the fresh food chamber 122). It is noted that although the access door 166 is illustrated in exemplary embodiments, alternative embodiments may be free of any separate access door.

Figure 3:
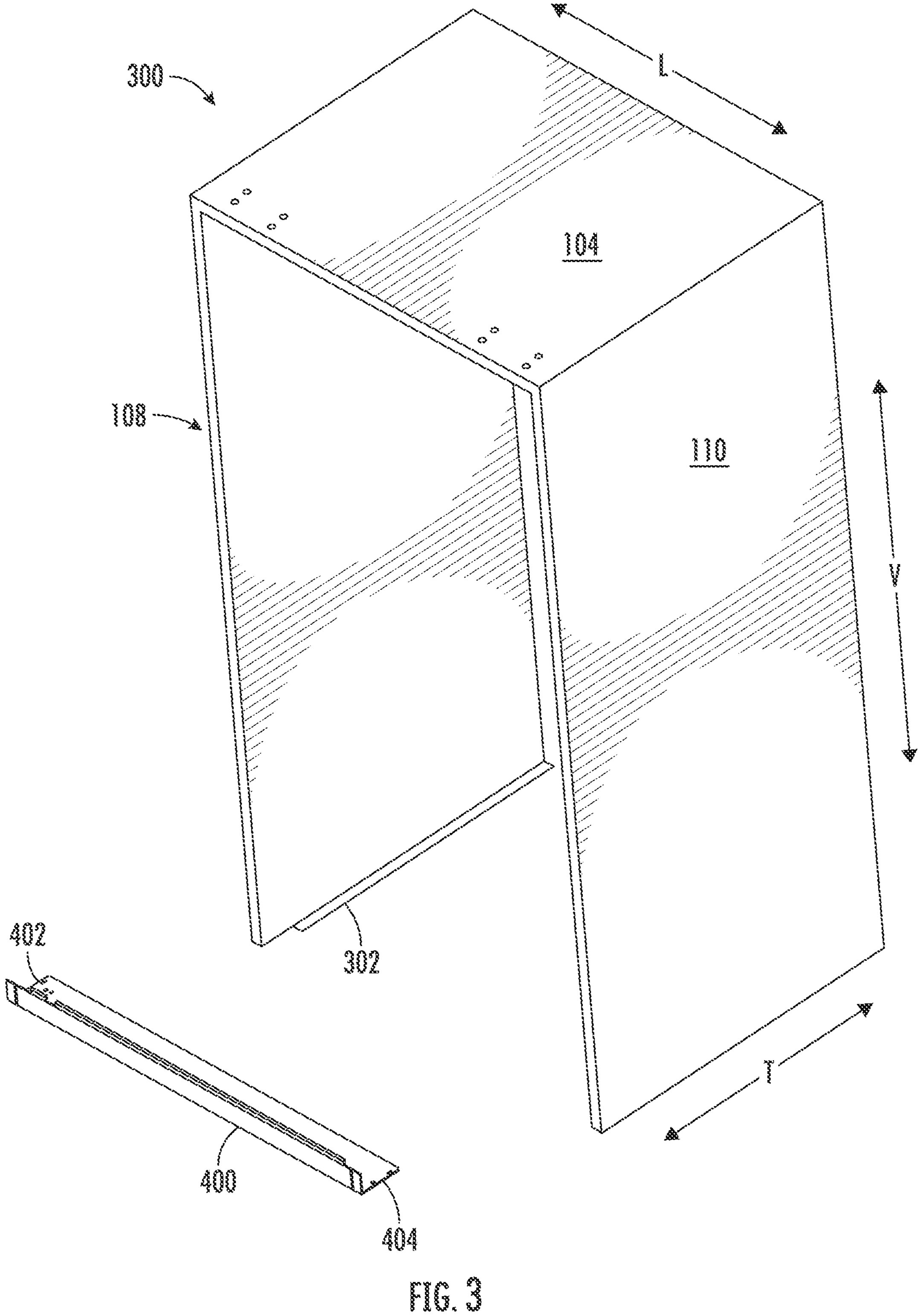
FIG. 3 provides a perspective view of a case body and a locator rail of the refrigerator appliance of FIG. 1 according to one or more exemplary embodiments of the present subject matter.

Referring now to FIG. 3, a perspective view of a case body 300 according to one or more exemplary embodiments of the present subject matter is provided. In some embodiments, the case body 300 may be a portion of the cabinet 102, such as the case body may define at least two external sides, e.g., the left side and the right side, of the cabinet 102. For instance, in some embodiments, the case body 300 may be formed into a "U" shape from a piece of sheet metal to provide the top 104, the left side 108, and the right side 110 of the cabinet 102. In addition, the case body 300 may extend approximately along the transverse direction T to define the front 112 and the back 114 of the refrigerator appliance 100. Moreover, in some embodiments, the case body 300 may include a first lip 302 positioned at the bottom edge of the left side 108 of the case body 300 and a second lip 304 (FIG. 7) positioned at the bottom edge of the right side 110 of the case body 300. The first lip 302 and the second lip 304 may be spaced apart approximately along the lateral direction L. An exemplary locator rail 400 according to one or more exemplary embodiments of the present subject matter may also be seen in FIG. 3. As will be described in more detail below, the locator rail 400 may be coupled to the case body 300, such as at a front bottom edge of the case body 300, e.g., as illustrated, or at another front edge of the case body 300, e.g., an intermediate front edge between the top 104 and a bottom of the case body 300.

As may be seen, e.g., in FIGS. 4, 5, 8, 9, 12, and 16, the locator rail 400 may be a single piece, e.g., a single unitarily formed piece of material, such as sheet metal material. The locator tail 400 may extend longitudinally from a first end 402 to a second end 404 opposite the first end 402 of the locator rail 400. For example, when installed, e.g., coupled to the case body 300, the locator rail 400 extends generally along the lateral direction L from the first end 402 to the second end 404. When installed, the first end 402 of the locator rail 400 may be positioned at the left side 108 of the cabinet 102, and the second end 404 of the locator rail 400 may be positioned at the right side 110 of the cabinet 102, such that the locator rail 400 may define a dimension of the cabinet 102 from the left to the right, such as a distance between the left side 108 of the cabinet 102 and the right side 110 of the cabinet 102, such as a width of the cabinet 102. The locator rail 400 may include a plurality of locator tabs formed on the locator rail 400, e.g., the locator tabs may be formed from the locator rail 400, e.g., from the single unitarily formed piece of material. For example, in some embodiments such as where the locator rail 400 is formed of sheet metal, the locator tabs may be stamped or punched from the same piece of sheet metal, such as all locator tabs may be punched in a single operation (including various sets of locator tabs which may extend from a main body of the locator rail 400 in opposing directions, as described further below, may be punched in the single operation).

The locator tabs may include two sets of case locator tabs, e.g., a first set of case locator tabs 406 (FIG. 4) at the first end 402 of the locator rail 400 and a second set of locator tabs 408 (FIG. 5) at the second end 404 of the locator rail 400. The plurality of locator tabs may further include one or more sets of bracket locator tabs (e.g., a set of bracket locator tabs for each door, such as two sets of bracket locator tabs in the illustrated exemplary embodiments where the appliance includes two doors). For example, in the illustrated embodiments, a first set of bracket locator tabs 422 (FIG. 8) are provided on the first end 402 of the locator rail 400 and a second set of bracket locator tabs 424 (FIG. 9) are provided at the second end 404 of the locator rail 400.

Figure 4:
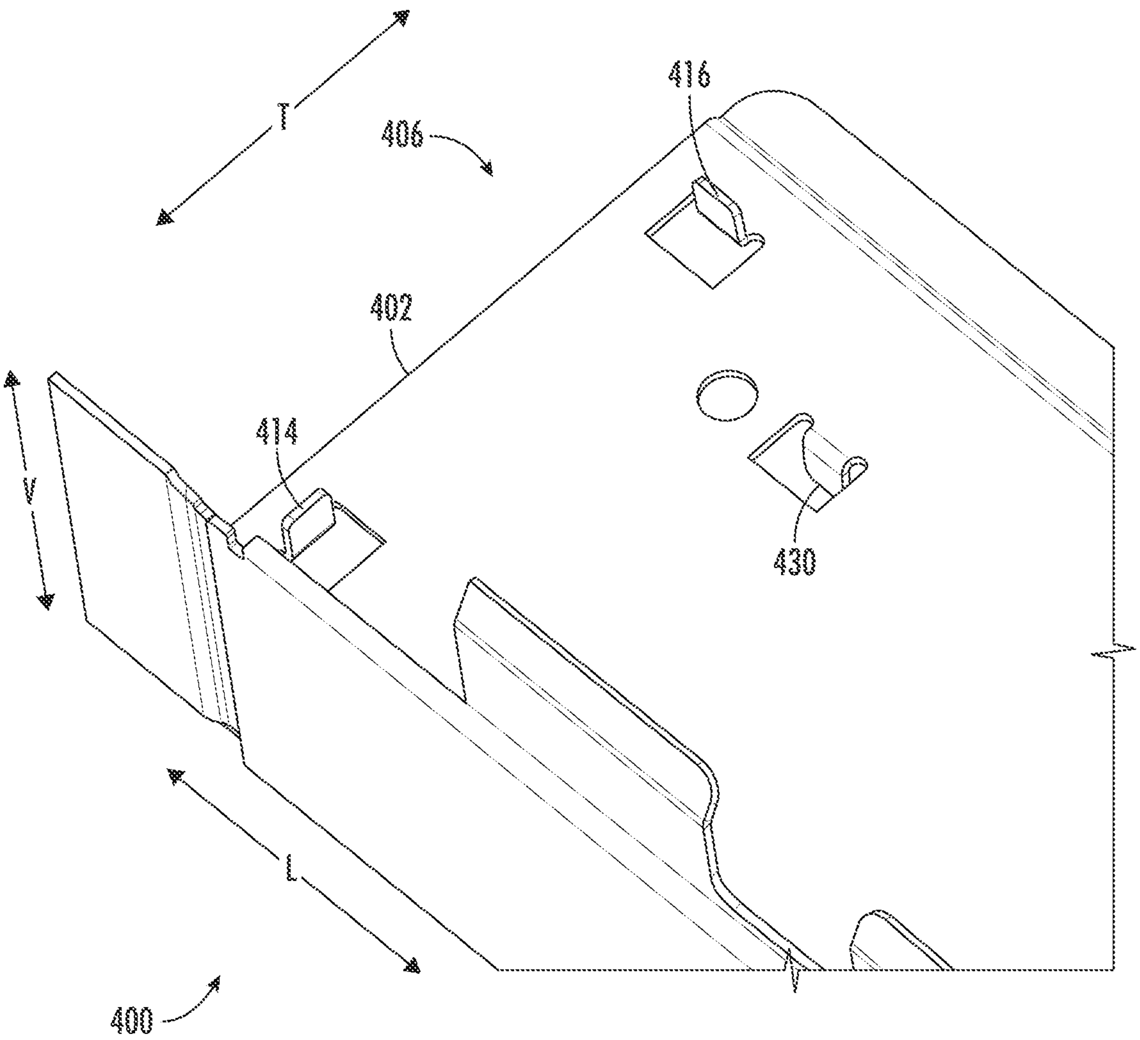
FIG. 4 provides a perspective view of a first end of a locator rail according to one or more exemplary embodiments of the present subject matter.
Figure 5:
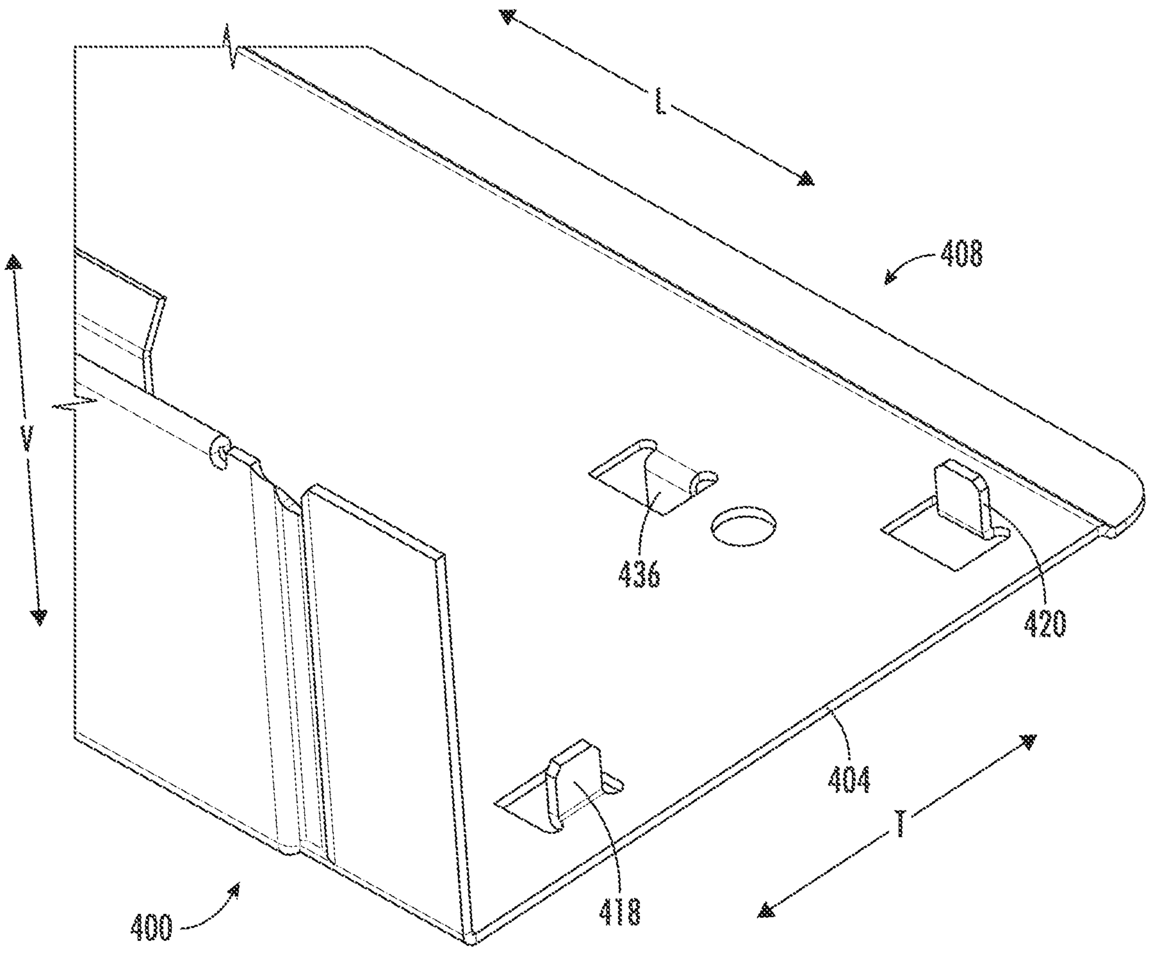
FIG. 5 provides a perspective view of a second end of the locator rail of FIG. 4.

FIG. 4 provides a perspective view of the top side of the locator rail 400 at the first end 402 of the locator rail 400. FIG. 5 provides a perspective view of the top side of the second end 404 of the locator rail 400. As illustrated in FIG. 4, in some embodiments, the first set of case locator tabs 406 may include a first case locator tab 414 and a second case locator tab 416. The first case locator tab 414 may be oriented along a first direction, e.g., such as generally along the transverse direction T, and the second case locator tab 416 may be oriented along a second direction perpendicular to the first direction, such as generally along the lateral direction L. As may be seen in FIG. 5, the second set of case locator tabs 408 may include a third case locator tab 418 and a fourth case locator tab 420. The third case locator tab 418 may be oriented generally along the first direction, e.g., generally parallel to the first case locator tab 414, and the fourth case locator tab 420 may be oriented generally along the second direction, e.g., generally parallel to and/or aligned with the second case locator tab 416.

Figure 6:
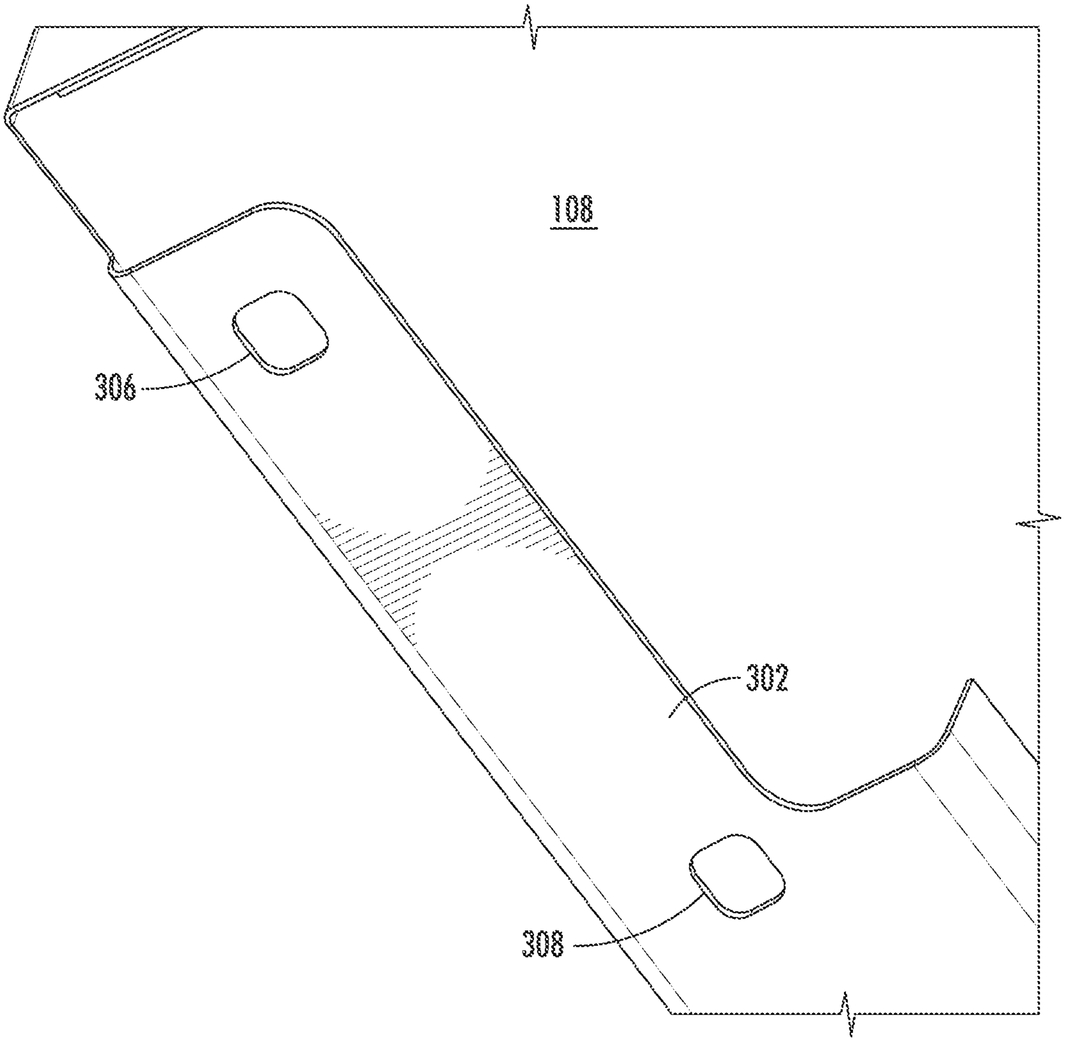
FIG. 6 provides a perspective view of a first lip of the case body of FIG. 3.
Figure 7:
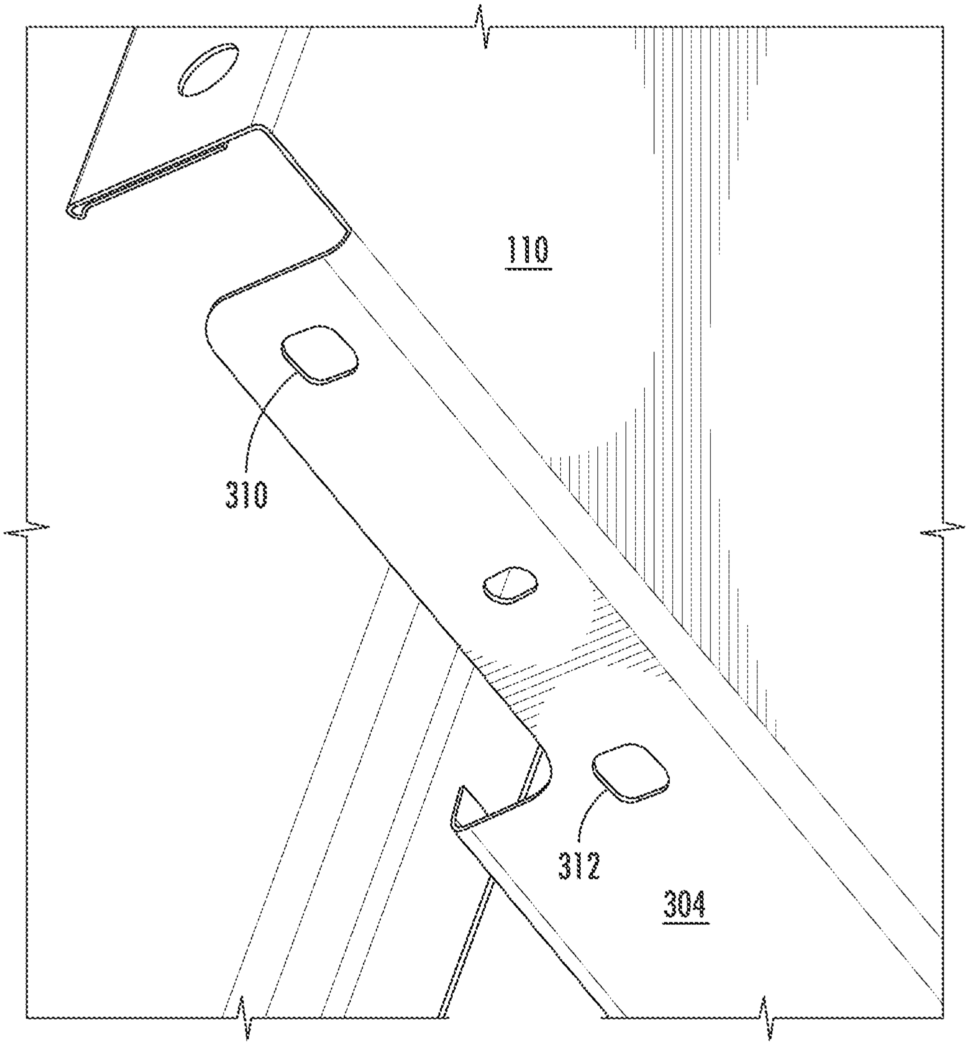
FIG. 7 provides a perspective view of a second lip of the case body of FIG. 3.

FIG. 6 provides a bottom perspective view of the left front corner of the case body 300, and FIG. 7 provides a bottom perspective view of the right front corner of the case body 300. As may be seen in FIG. 6, the case body 300 may include a first slot 306 and a second slot 308 formed in the first lip 302. The first case locator tab 414 (FIG. 4) may be received in and engaged with the first slot 306, and the second locator tab 416 (FIG. 4) may be received in and engaged with the second slot 308. As may be seen in FIG. 7, the case body 300 may include a third slot 310 and a fourth slot 312 formed in the second lip 304. The third case locator tab 418 (FIG. 5) may be received in and engaged with the third slot 310, and the fourth case locator tab 420 (FIG. 5) may be received in and engaged with the fourth slot 312. Such engagement of each of the case locator tabs 414, 416, 418, and 420 of the locator rail 400 with the respective slots 306, 308, 310, and 312 in the first and second lips 302 and 304 may be seen, e.g., in FIGS. 8 and 9.

Figure 8:
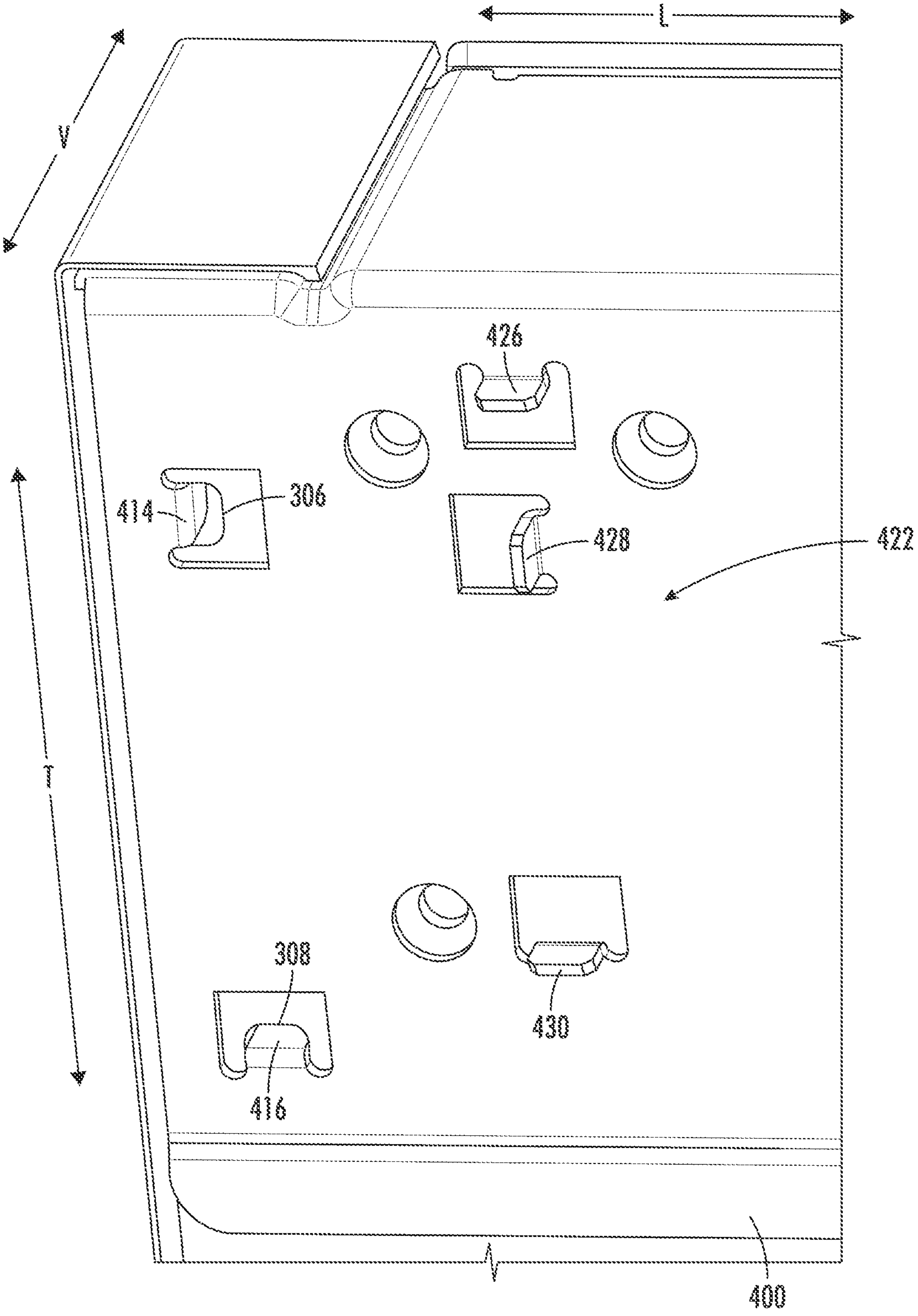
FIG. 8 provides a perspective view of the first end of the locator rail of FIG. 4 attached to the first lip of FIG. 6.
Figure 9:
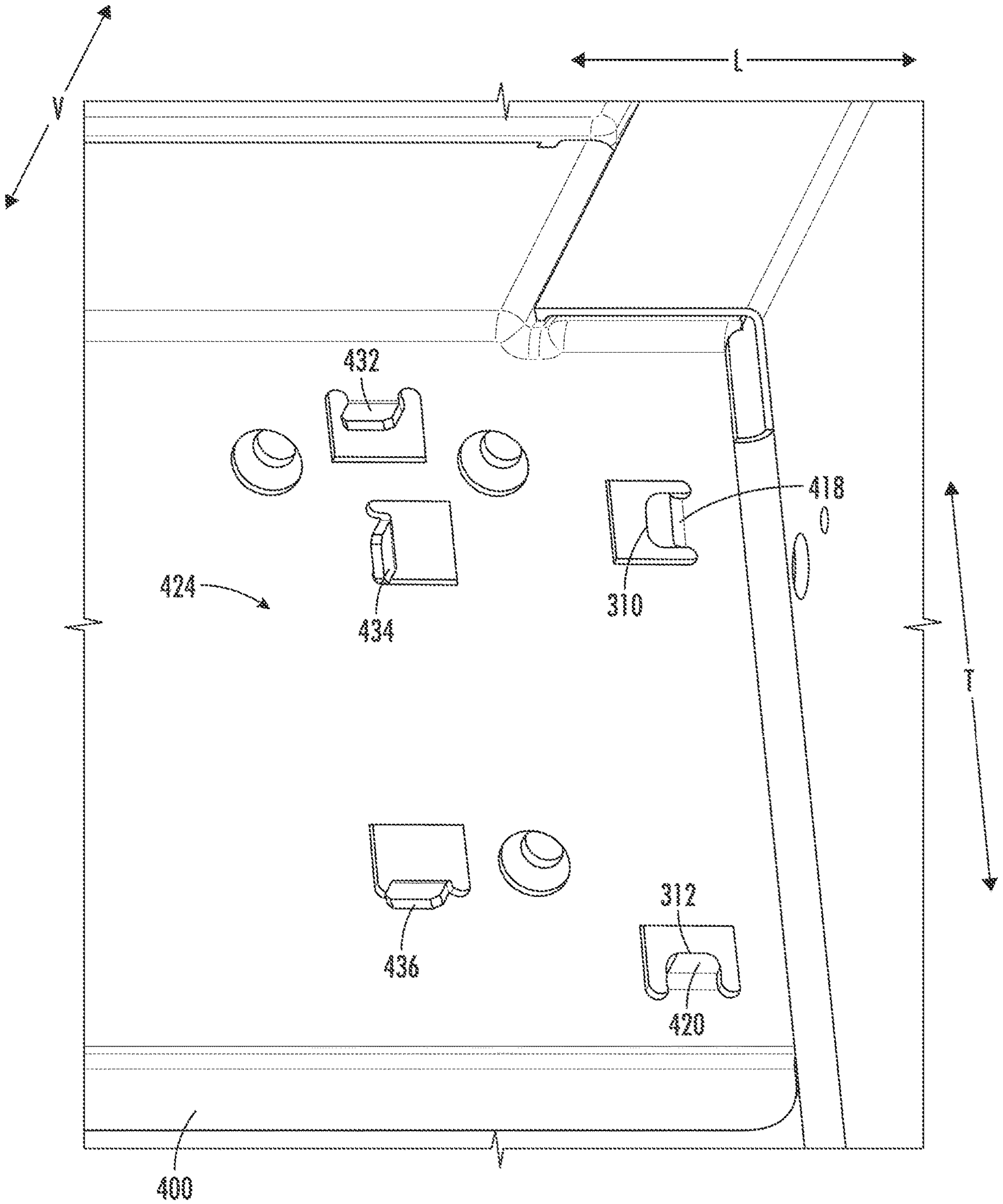
FIG. 9 provides a perspective view of the second end of the locator rail of FIG. 5 attached to the second lip of FIG. 7.

As may be seen, e.g., in FIGS. 8 and 9, the locator rail 400 may further include a first set of bracket locator tabs 422 at the first end 402 of the locator rail 400 and a second set of bracket locator tabs 424 at the second end 404 of the locator rail 400. Each set of bracket locator tabs 422 and 424 may include two or more bracket locator tabs, such as at least one bracket locator tab oriented in a first direction and at least one other bracket locator tab oriented in a second direction generally perpendicular to the first direction, such as generally along the lateral direction L and the transverse direction T.

As may be seen, e.g., in FIGS. 4, 5, 8, and 9, the bracket locator tabs may all extend from the locator rail 400 in one vertical direction, whereas the case locator tabs may all extend from the locator rail 400 in another vertical direction, such as in a generally opposite direction. For example, each locator tab of the first set of case locator tabs 406 and each locator tab of the second set of case locator tabs 408 may extend from a main body of the locator rail 400 in a first vertical direction, and each bracket locator tab of the first and/or second set(s) of bracket locator tabs 422, 424 may extend from the main body of the locator rail 400 in a second vertical direction opposite the first vertical direction. In some embodiments, e.g., as illustrated in FIGS. 4, 5, 8, and 9, the case locator tabs may extend generally upwards along the vertical direction V and the bracket locator tabs may extend generally downwards along the vertical direction V.

As may be seen, for example, in FIG. 8, the first set of bracket locator tabs 422 may include three bracket locator tabs. The first set of bracket locator tabs 422 may include a first bracket locator tab 426, a second bracket locator tab 428, and a third bracket locator tab 430. The first bracket locator tab 426 may be oriented along a first direction, e.g., generally along or generally parallel to the lateral direction L, the second bracket locator tab 428 may be oriented along a second direction approximately perpendicular to the first direction, e.g., generally along or generally parallel to the transverse direction T, and the third bracket locator tab 430 may be oriented along the first direction, e.g., generally parallel to the first bracket locator tab 426.

Referring now to FIG. 9 in particular, the second set of bracket locator tabs 424 may include three bracket locator tabs. The second set of bracket locator tabs 424 may include a fourth bracket locator tab 432, a fifth bracket locator tab 434, and a sixth bracket locator tab 436. The fourth bracket locator tab 432 may be oriented along a first direction, e.g., generally along or generally parallel to the lateral direction L, the fifth bracket locator tab 434 may be oriented along a second direction approximately perpendicular to the first direction, e.g., generally along or generally parallel to the transverse direction T, and the sixth bracket locator tab 436 may be oriented along the first direction, e.g., generally parallel to the fourth bracket locator tab 432.

Figure 10:
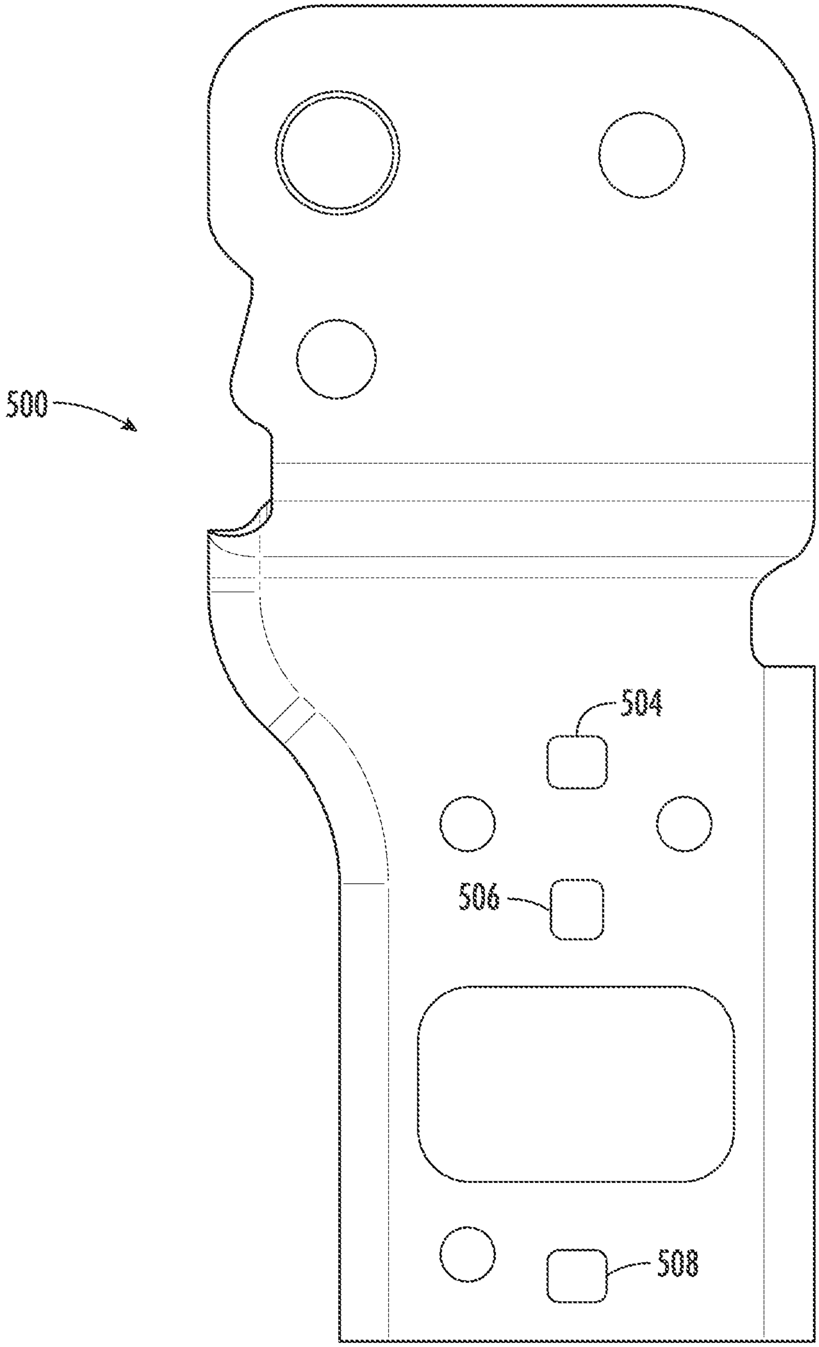
FIG. 10 illustrates a first hinge bracket according to one or more exemplary embodiments of the present subject matter.
Figure 11:
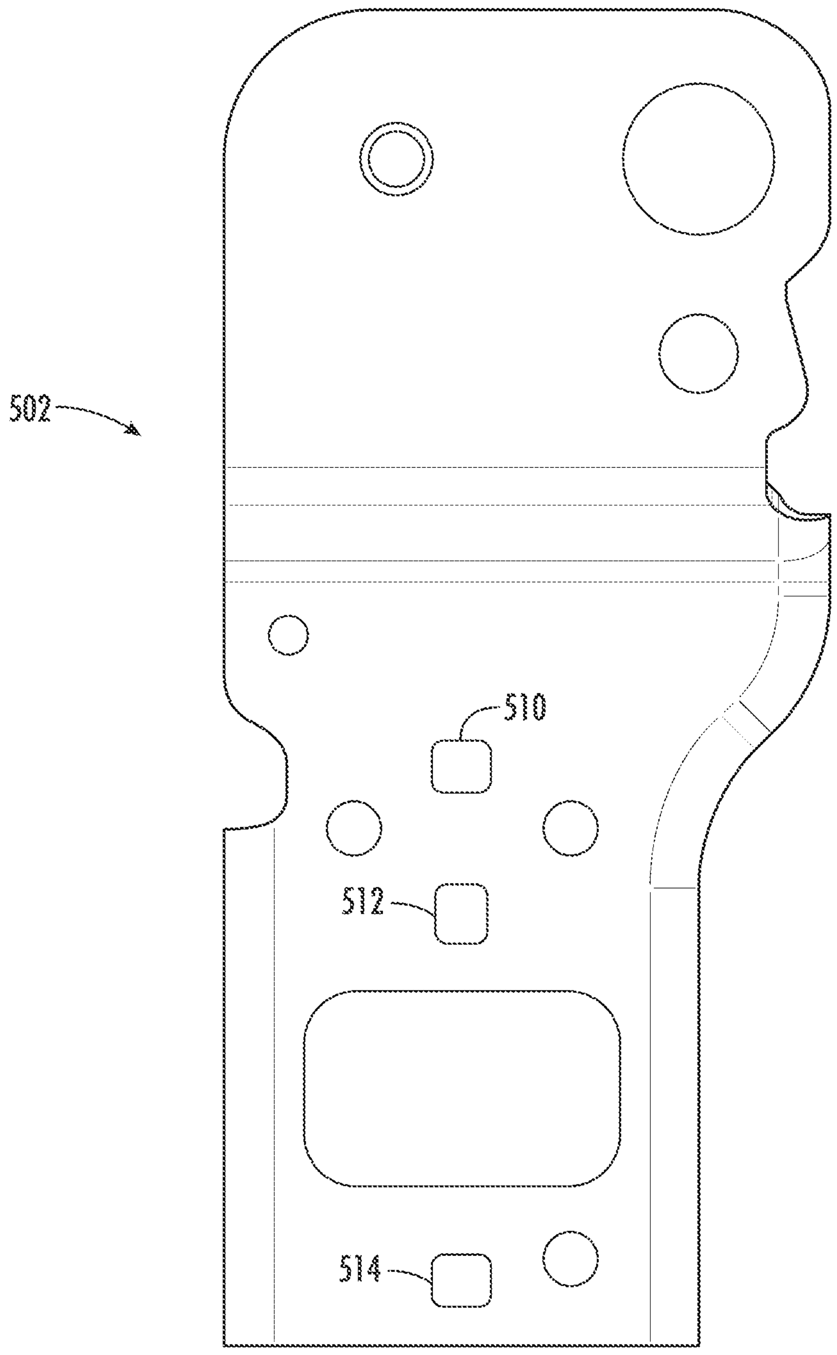
FIG. 11 illustrates a second hinge bracket according to one or more exemplary embodiments of the present subject matter.

In some embodiments, an exemplary household appliance, such as the illustrated refrigerator appliance 100, may include one or more hinge brackets. For example, as shown in FIG. 10 and FIG. 11, the refrigerator appliance 100 may include a first hinge bracket 500 (FIG. 10) and a second hinge bracket 502 (FIG. 11). The first hinge bracket 500 may be configured to mount to the locator rail 400 at the first end 402, e.g., by mutual engagement of respective tabs and slots, and the second hinge bracket 502 may be configured to mount to the locator rail 400 at the second end 404, e.g., by mutual engagement of respective tabs and slots. As may be seen in FIG. 10, the first hinge bracket 500 may include a plurality of slots, with each slot corresponding to a bracket locator tab of the first set of bracket locator tabs 422. In some embodiments, the first hinge bracket 500 may include a fifth slot 504, a sixth slot 506, and a seventh slot 508. As may be seen in FIG. 11, the second hinge bracket 502 may include a plurality of slots, with each slot corresponding to a bracket locator tab of the second set of bracket locator tabs 424. In some embodiments, the second hinge bracket 502 may include an eighth slot 510, a ninth slot 512, and a tenth slot 514.

Figure 12:
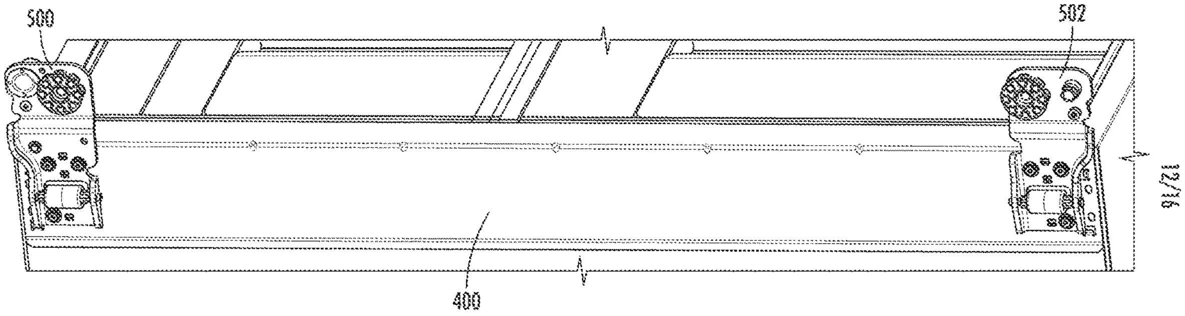
FIG. 12 provides a perspective view of the first hinge bracket of FIG. 10 mounted to the locator rail of FIGS. 3 and 8 and the second hinge bracket of FIG. 11 mounted to the locator rail of FIGS. 3 and 9.
Figure 13:
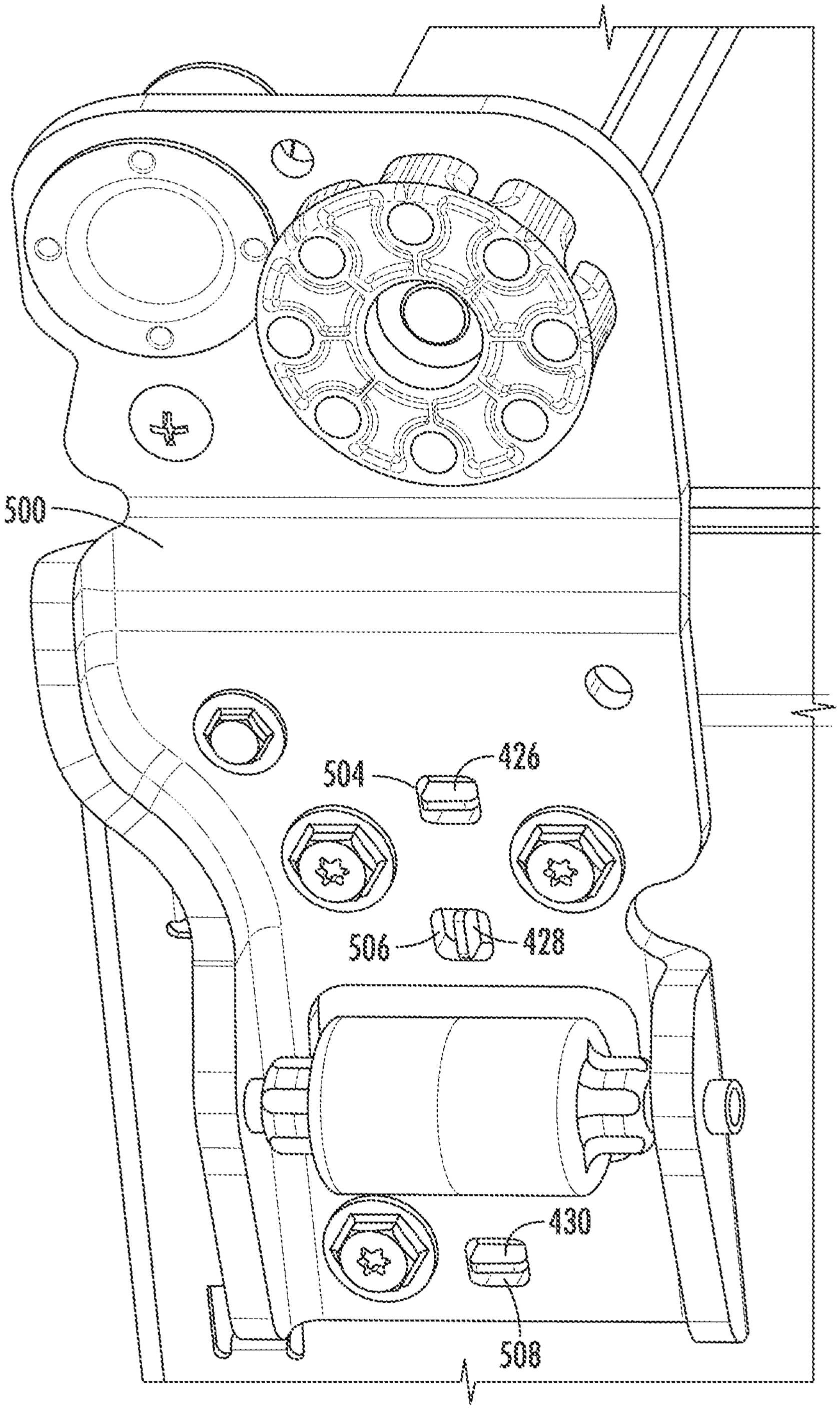
FIG. 13 provides an enlarged perspective view of the first hinge bracket of FIG. 12.
Figure 14:
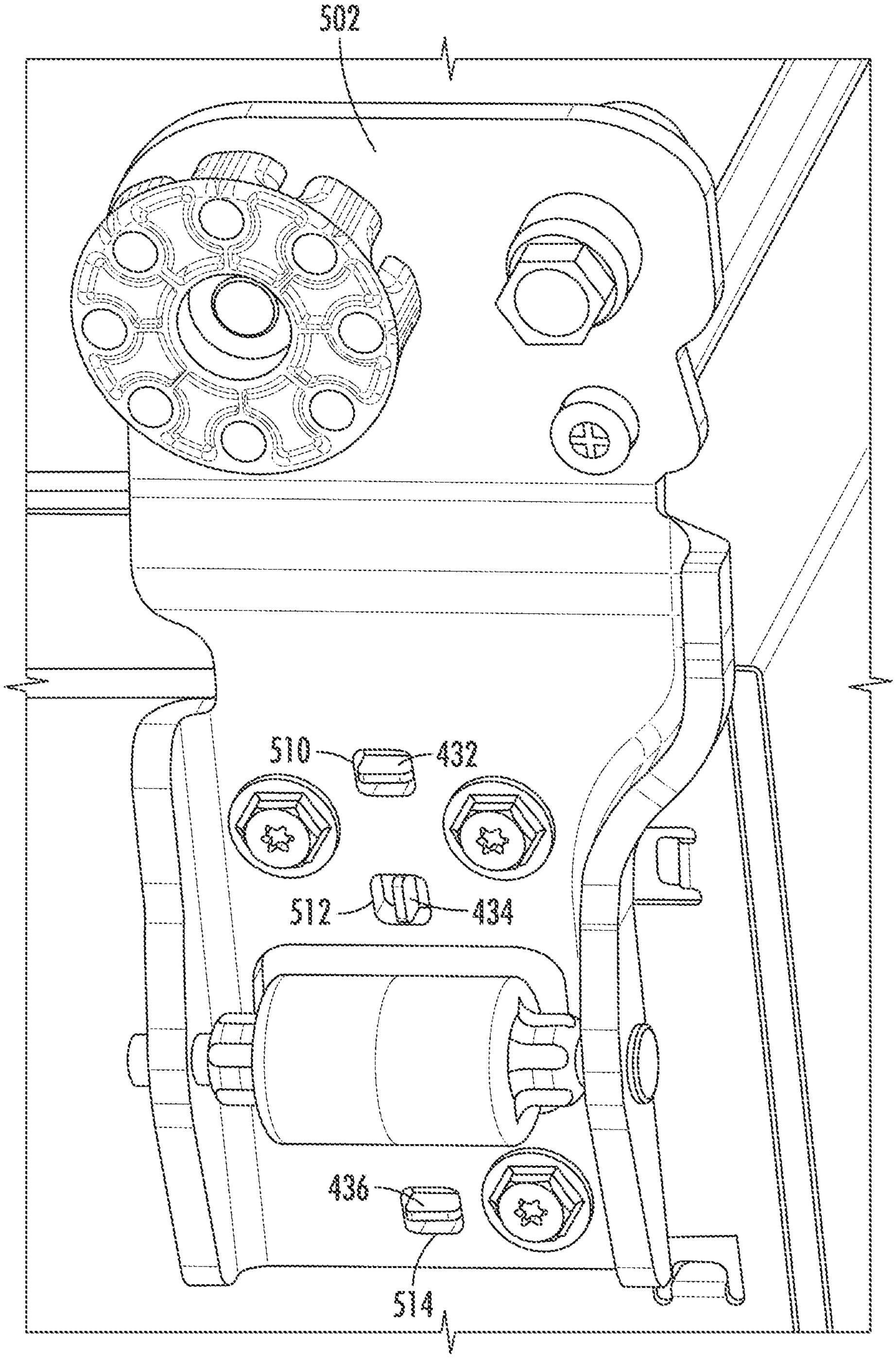
FIG. 14 provides an enlarged perspective view of the second hinge bracket of FIG. 12.

The first and second hinge brackets 500 and 502 may be mounted to the locator rail 400, e.g., as illustrated in FIG. 12, FIG. 13, and FIG. 14. As shown in FIG. 12, the first and second hinge brackets 500 and 502 may be mounted to opposite ends of the locator rail 400. As may be better seen in FIG. 13, the first hinge bracket 500 may be mounted to, e.g., fastened to, the locator rail 400 at the first end 402, and the first hinge bracket 500 may be aligned with the locator rail 400 by the first bracket locator tab 426 in the fifth slot 504, the second bracket locator tab 428 in the sixth slot 506, and the third bracket locator tab 430 in the seventh slot 508. As may be better seen in FIG. 14, the second hinge bracket 502 may be mounted to, e.g., fastened to, the locator rail 400 at the second end 404, and the second hinge bracket 502 may be aligned with the locator rail 400 by the fourth bracket locator tab 432 in the eighth slot 510, the fifth bracket locator tab 434 in the ninth slot 512, and the sixth bracket locator tab 436 in the tenth slot 514.

Figure 15:
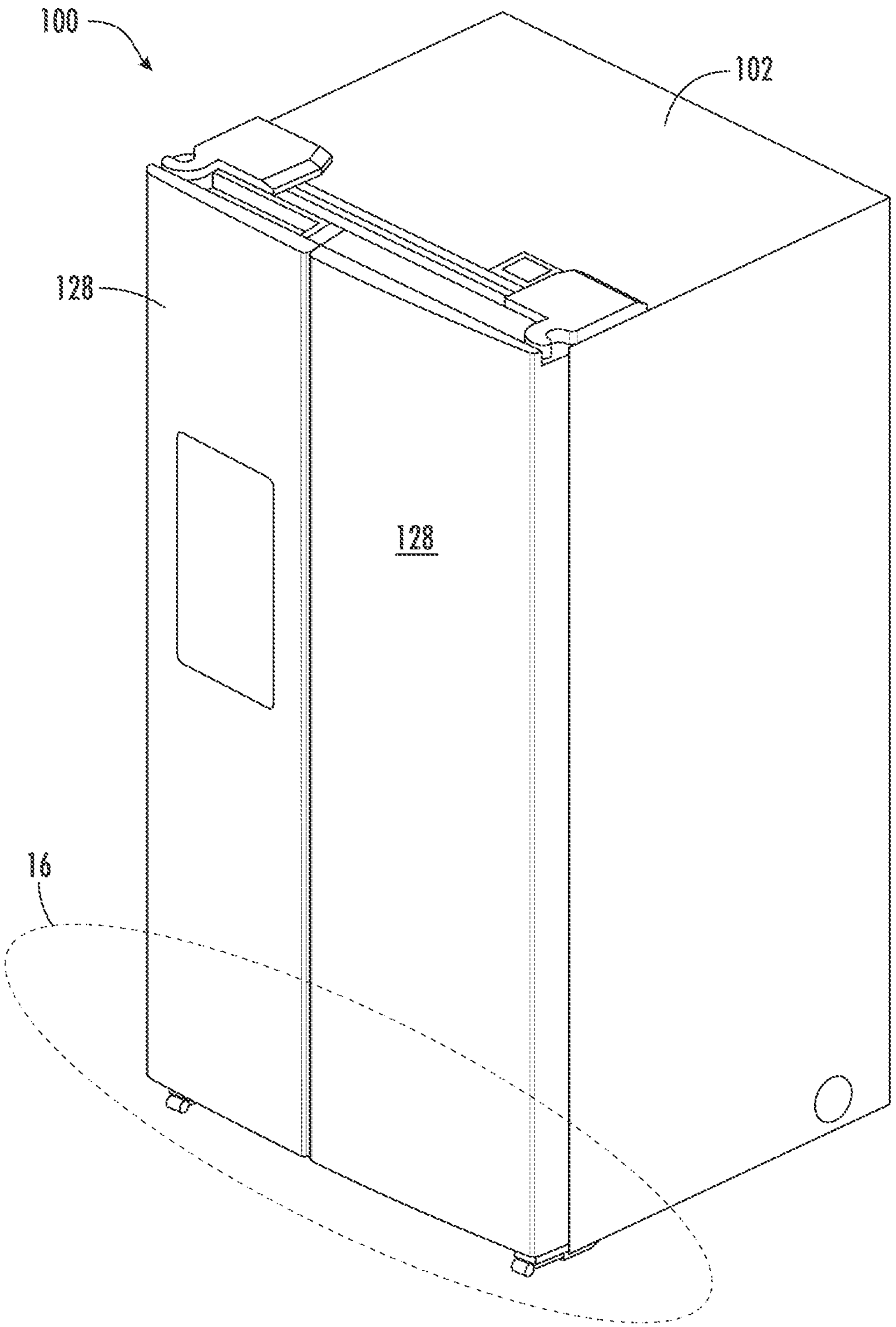
FIG. 15 provides a perspective view of an exemplary household appliance, e.g., a refrigerator appliance, with the locator rail, hinge brackets, and doors mounted on the cabinet of the household appliance according to one or more exemplary embodiments of the present subject matter.
Figure 16:
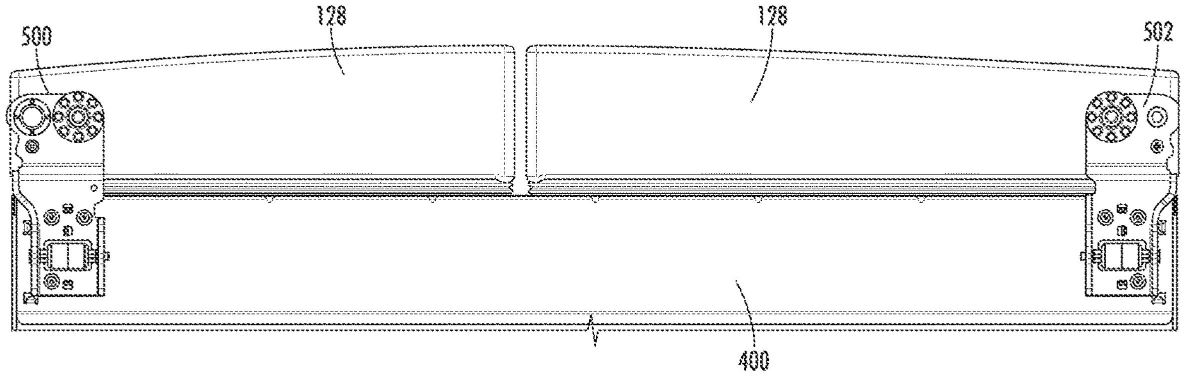
FIG. 16 provides a bottom view of a portion of the household appliance of FIG. 15.

FIG. 15 provides a perspective view of an exemplary household appliance, e.g., a refrigerator appliance, e.g., a side-by-side refrigerator appliance, with a cabinet 102 (of which the case body 300 is a part, although the case body 300 is not specifically labelled in FIG. 15), doors 128 mounted to the cabinet 102, e.g., hingedly mounted to the cabinet 102 by top hinges (shown in FIG. 15 but not labelled) and bottom hinges (FIG. 16). FIG. 16 is a bottom view looking up at a portion of the household appliance of FIG. 15, the portion indicated by oval 16 in FIG. 15. As may be seen in FIG. 16, each door 128 may be mounted to the cabinet 102 via hinges, including bottom hinges each of which is attached to a respective one of the first and second hinge brackets 500 and 502, and the hinges may be mounted to the cabinet via the first and second hinge brackets 500 and 502 and the locator rail 400. Accordingly, the locator tabs and slots may provide alignment of the doors 128 with each other and/or with the cabinet 102 (such as with the case body 300 thereof).

In some embodiments, each slot 306, 308, 310, 312, 504, 506, 508, 510, 512, and 514 may be generally symmetrical (e.g., may have up to 10% variance from any one side to another), such as each slot may be generally square in cross-sectional shape, such as may be square with rounded corners, e.g., filleted corners, e.g., each slot may have a squircle cross-sectional shape. Each set of slots may be aligned. For example, as shown in FIGS. 6 and 7, the first slot 306 and the second slot 308 in the first lip 302 of the case may be aligned generally along the transverse direction T, such that the centers of the slots 306 and 308 are colinear along a line that is generally parallel to the transverse direction T, and the third slot 310 and the fourth slot 312 in the second lip 304 may be similarly aligned, e.g., such that the centers of the slots 310 and 312 are colinear along a line that is generally parallel to the transverse direction T. Further, the first slot 306 may be laterally aligned with the third slot 310 and the second slot 308 may be laterally aligned with the fourth slot 312, where "laterally aligned" refers to the centers of each pair of slots being colinear along a line that is generally parallel to the lateral direction L. In another example, e.g., as illustrated in FIGS. 10 and 11, the hinge bracket slots may also be transversely aligned within each respective hinge bracket. In some embodiments, the fifth slot 504, sixth slot 506, and seventh slot 508 in the first hinge bracket 500 may be transversely aligned such that the centers of the slots are colinear along a line that is generally parallel to the transverse direction T (e.g., when the first hinge bracket 500 is mounted to the locator rail 400), as shown in FIG. 10. Similarly, and as illustrated in FIG. 11, the eighth slot 510, ninth slot 512, and tenth slot 514 in the second hinge bracket 502 may also be transversely aligned.

As may be seen, e.g., in FIGS. 12 and 16, the first and second sets of bracket locator tabs 422 and 424 may be laterally aligned, e.g., each bracket locator tab of the first set of bracket locator tabs 422 may be laterally aligned with a corresponding one bracket locator tab of the second set of bracket locator tabs 424. For example, the first bracket locator tab 426 may be laterally aligned with the fourth bracket locator tab 432, the second bracket locator tab 428 may be laterally aligned with the fifth bracket locator tab 434, and the third bracket locator tab 430 may be laterally aligned with the sixth bracket locator tab 436, where "laterally aligned" refers to the centers of the respective tabs being colinear along a line that is generally parallel to the lateral direction L.

The engagement of each locator tab on the locator rail 400 with a respective slot on the case body 300 or hinge brackets 500 and 502 constrains relative movement of the respective pieces and provides consistent, accurate, and precise alignment of the components of the household appliance, in particular the doors with each other and with the cabinet. As noted above, each locator tab may be oriented along a particular direction, such as one of the lateral direction L or the transverse direction T. For example, the first bracket locator tab 426 may be oriented along the lateral direction L such that engagement of the first bracket locator tab 426 with the fifth slot 504 may constrain relative movement of the locator rail 400 and the first hinge bracket 500 along the first direction, e.g., generally along the lateral direction L, such as in two ways, e.g., left and right, along the lateral direction L. The additional tabs which are oriented along the lateral direction L may, when engaged with each respective slot, similarly constrain relative movement of the locator rail 400 and the case body 300 or one of the hinge brackets 500 or 502, e.g., in two ways, left and right, generally along the lateral direction L. Also, the tab or tabs which are oriented generally along the transverse direction T (e.g., tabs 414, 418, 428, and 434) may, when engaged with each respective slot, similarly constrain relative movement of the locator rail 400 and the case body 300 or one of the hinge brackets 500 or 502, e.g., in two ways, front and back, generally along the transverse direction T.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An appliance defining a vertical direction, a lateral direction, and a transverse direction, the appliance comprising:

a case body, the case body comprising a left side and a right side opposite the left side, the left side and the right side spaced apart along the lateral direction;

a first lip on the left side of the case body;

a second lip on the right side of the case body;

a locator rail attached to the case body, the locator rail comprising a first set of locator tabs at a first end of the locator rail and a second set of locator tabs at a second end of the locator rail opposite the first end of the locator rail, each locator tab of the first set of locator tabs engaged with one corresponding slot in the first lip of the case body, and each locator tab of the second set of locator tabs engaged with one corresponding slot in the second lip of the case body; and a set of bracket locator tabs on the locator rail, wherein each locator tab of the first set of locator tabs and each locator tab of the second set of locator tabs extends from a main body of the locator rail in a first vertical orientation, and wherein each bracket locator tab of the set of bracket locator tabs extends from the main body of the locator rail in a second vertical orientation opposite the first vertical orientation.

2. The appliance of claim 1, further comprising a a hinge bracket mounted to the locator rail, each bracket locator tab of the set of bracket locator tabs engaged with one corresponding slot in the hinge bracket.

3. The appliance of claim 1, wherein the first set of locator tabs comprises a first locator tab and a second locator tab, the first locator tab oriented along a first direction whereby the first locator tab constrains movement of the locator rail and the first lip along the first direction, the second locator tab oriented along a second direction approximately perpendicular to the first direction whereby the second locator tab constrains movement of the locator rail and the first lip along the second direction.

4. The appliance of claim 3, wherein the second set of locator tabs comprises a third locator tab and a fourth locator tab, the third locator tab oriented along the first direction whereby the third locator tab constrains movement of the locator rail and the second lip along the first direction, the fourth locator tab oriented along the second direction whereby the fourth locator tab constrains movement of the locator rail and the second lip along the second direction.

5. The appliance of claim 4, further comprising a housing, the case body defining at least two external sides of the housing, wherein the locator rail defines a width of the housing.

6. The appliance of claim 1, wherein the locator rail, the first set of locator tabs, and the second set of locator tabs are formed of a unitary construction.

7. The appliance of claim 1, wherein the locator rail is formed from a single piece of sheet metal, and wherein the first set of locator tabs and the second set of locator tabs are punched from the single piece of sheet metal.

8. The appliance of claim 1, wherein the set of bracket locator tabs comprises a first bracket locator tab on the locator rail, a second bracket locator tab on the locator rail, and third bracket locator tab on the locator rail.

9. An appliance comprising:

a case body, the case body comprising a left side and a right side opposite the left side, the left side and the right side spaced apart along a lateral direction;

a locator rail extending across the case body between the left side and the right side, the locator rail comprising a plurality of locator tabs, each locator tab of the plurality of locator tabs engaged with one corresponding slot in the case body;

a set of bracket locator tabs on the locator rail, wherein each locator tab of the plurality of locator tabs extends from a main body of the locator rail in a first vertical orientation, and wherein each bracket locator tab of the set of bracket locator tabs extends from the main body of the locator rail in a second vertical orientation opposite the first vertical orientation; and a hinge bracket mounted to the locator rail, each bracket locator tab of the set of bracket locator tabs engaged with one corresponding slot in the hinge bracket.

10. The appliance of claim 9, wherein the case body further comprises a first lip on the left side of the case body and a second lip on the right side of the case body, wherein the plurality of locator tabs on the locator rail comprises a first set of locator tabs at a first end of the locator rail and a second set of locator tabs at a second end of the locator rail opposite the first end of the locator rail, each locator tab of the first set of locator tabs engaged with one corresponding slot in the first lip of the case body, and each locator tab of the second set of locator tabs engaged with one corresponding slot in the second lip of the case body.

11. The appliance of claim 9, wherein the set of bracket locator tabs on the locator rail comprises a first bracket locator tab, a second bracket locator tab, and a third bracket locator tab, the first bracket locator tab oriented along a first direction whereby the first bracket locator tab constrains movement of the locator rail and the hinge bracket along the first direction, the second bracket locator tab oriented along a second direction approximately perpendicular to the first direction whereby the second bracket locator tab constrains movement of the locator rail and the hinge bracket along the second direction, and the third bracket locator tab oriented along the first direction, whereby the third bracket locator tab constrains movement of the locator rail and the hinge bracket along the first direction.

12. The appliance of claim 11, wherein the second bracket locator tab is positioned between the first bracket locator tab and the third bracket locator tab.

13. The appliance of claim 9, wherein the set of bracket locator tabs on the locator rail is a first set of bracket locator tabs, further comprising a second set of bracket locator tabs, the first set of bracket locator tabs at a first end of the locator rail and the second set of bracket locator tabs at a second end of the locator rail opposite the first end of the locator rail.

14. The appliance of claim 13, wherein the hinge bracket is a first hinge bracket, further comprising a second hinge bracket mounted to the locator rail, each bracket locator tab of the second set of bracket locator tabs engaged with one corresponding slot in the second hinge bracket.

15. The appliance of claim 14, further comprising a first door rotatably mounted to the case body by the first hinge bracket at a bottom of the first door and a second door rotatably mounted to the case body by the second hinge bracket at a bottom of the second door.

16. The appliance of claim 9, wherein the locator rail and the set of bracket locator tabs are formed of a unitary construction.

17. The appliance of claim 9, wherein the locator rail is formed from a single piece of sheet metal, and wherein the set of bracket locator tabs are punched from the single piece of sheet metal.

18. The appliance of claim 9, wherein the plurality of locator tabs comprises a first locator tab at a first end of the locator rail, a second locator tab at the first end of the locator rail, a third locator tab at a second end of the locator rail opposite the first end of the locator rail, and a fourth locator tab at the second end of the locator rail, the first locator tab and the third locator tab oriented along a first direction, the second locator tab and the fourth locator tab oriented along a second direction approximately perpendicular to the first direction.

* * * * *